US008882031B2

(12) United States Patent
Dennison et al.

(10) Patent No.: US 8,882,031 B2
(45) Date of Patent: Nov. 11, 2014

(54) REMOVABLE HORIZONTAL STABILIZER FOR HELICOPTER

(71) Applicant: Bell Helicopter Textron Inc., Fort Worth, TX (US)

(72) Inventors: William D. Dennison, Keller, TX (US); Carl A. May, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 14/088,506

(22) Filed: Nov. 25, 2013

(65) Prior Publication Data

US 2014/0077029 A1    Mar. 20, 2014

Related U.S. Application Data

(63) Continuation of application No. 13/496,241, filed as application No. PCT/US2009/057261 on Sep. 17, 2009, now Pat. No. 8,602,351.

(51) Int. Cl.
*B64C 5/02* (2006.01)
*B64C 1/26* (2006.01)
*B64C 27/04* (2006.01)

(52) U.S. Cl.
CPC . *B64C 5/02* (2013.01); *B64C 27/04* (2013.01); *B64C 1/26* (2013.01)
USPC ............................................ 244/89; 244/131

(58) Field of Classification Search
USPC ........... 244/7 B, 36, 37, 17.11, 123.1, 123.14
See application file for complete search history.

(56) References Cited

U.S. PATENT DOCUMENTS

| 2,959,373 | A | * | 11/1960 | Zuck .............................. 244/7 C |
| 3,081,052 | A |   | 3/1963  | Michel et al. |
| 3,260,482 | A |   | 7/1966  | Stroukoff |
| 3,327,995 | A |   | 6/1967  | Blackhurst et al. |
| 3,409,248 | A |   | 11/1968 | Harvard |
| 3,717,317 | A |   | 2/1973  | Certain et al. |
| 4,034,939 | A | * | 7/1977  | Ridley et al. ..................... 244/87 |
| 4,227,665 | A | * | 10/1980 | Carlson et al. ................. 244/210 |
| 4,247,061 | A | * | 1/1981  | Kuczynski et al. ........ 244/17.19 |

(Continued)

FOREIGN PATENT DOCUMENTS

JP         6101977 A      4/1994

OTHER PUBLICATIONS

Canadian Office Action in related Canadian patent application No. 2,771,482, mailed Oct. 16, 2013, 2 pages.

(Continued)

*Primary Examiner* — Benjamin P Lee
(74) *Attorney, Agent, or Firm* — James E. Walton; Richard G. Eldredge

(57) ABSTRACT

An easily removable and lightweight horizontal stabilizer configured to provide aerodynamic stability for a rotorcraft. The horizontal stabilizer comprising a spar removably coupled to a tailboom with a removable spar attachment means, the spar being located transversely through a tailboom opening and configured to provide structural support for at least a first horizontal airfoil and a second horizontal airfoil. The first and second horizontal airfoils are configured to fittingly receive the spar so that the spar fits at least partially inside the first and second horizontal airfoils. The first and second horizontal airfoils extend outboard from the tailboom to provide aerodynamic pitch stability.

12 Claims, 6 Drawing Sheets

(56) References Cited

U.S. PATENT DOCUMENTS

| | | | |
|---|---|---|---|
| 5,056,741 | A | 10/1991 | Bliesner et al. |
| 5,094,412 | A | 3/1992 | Narramore |
| 5,205,714 | A | 4/1993 | Shah et al. |
| 5,209,430 | A * | 5/1993 | Wilson et al. ............. 244/17.19 |
| 5,377,934 | A * | 1/1995 | Hill ............................ 244/17.11 |
| 5,547,629 | A | 8/1996 | Diesen et al. |
| 5,641,133 | A | 6/1997 | Toossi |
| 5,645,249 | A * | 7/1997 | Hein ............................... 244/49 |
| 5,727,754 | A | 3/1998 | Carter, Jr. |
| 5,807,454 | A * | 9/1998 | Kawabe et al. .............. 156/214 |
| 6,024,325 | A | 2/2000 | Carter, Jr. |
| 6,830,214 | B2 * | 12/2004 | Carson ...................... 244/17.11 |
| 7,059,259 | B2 | 6/2006 | Allen |
| 7,182,293 | B2 * | 2/2007 | Sarh ........................... 244/123.7 |
| 7,275,711 | B1 * | 10/2007 | Flanigan .................... 244/17.11 |
| 7,975,965 | B2 * | 7/2011 | Ackermann et al. .......... 244/124 |
| 8,210,468 | B2 * | 7/2012 | Desroche ................... 244/17.11 |
| 8,376,265 | B2 * | 2/2013 | Desroche ................... 244/17.11 |
| 2004/0007645 | A1 | 1/2004 | Carson |
| 2006/0097104 | A1 * | 5/2006 | Eglin ......................... 244/17.11 |
| 2006/0104812 | A1 | 5/2006 | Kovalsky et al. |
| 2009/0008498 | A1 | 1/2009 | Sesroche et al. |
| 2010/0044508 | A1 * | 2/2010 | Pancotti et al. ............ 244/118.1 |

OTHER PUBLICATIONS nternational Search Report and Written Opinion of the International Searching Authority mailed by ISA/US on Jan. 13, 2010 for International Patent Application No. PCT/US09/57261, 9 pages.

International Preliminary Report on Patentability mailed by IPEA/US on Jan. 17, 2012 for International Patent Application No. PCT/US09/57261, 16 pages.

Extended European Search Report in related European patent application No. 09849618, 4 pages, mailed Jan. 24, 2013.

Examination Report in related Chinese patent application No. 2009801612731, 11 pages, mailed Jan. 24, 2014.

* cited by examiner

REMOVABLE HORIZONTAL STABILIZER FOR HELICOPTER

BACKGROUND

1. Field of the Invention

The present application relates in general to the field of aerodynamic structures for rotorcraft; but more particularly, horizontal stabilizers for rotorcraft.

2. Description of Related Art

There are many different types of rotorcraft, including helicopters, tandem rotor helicopters, tiltrotor aircraft, four-rotor tiltrotor aircraft, tilt wing aircraft, and tail sitter aircraft. At least some of these aforementioned rotorcraft utilize horizontal stabilizers attached to a tailboom in order to provide aerodynamic stability during flight. Typically, a horizontal stabilizer will have one or more horizontal surfaces to aid in aerodynamic pitch stability. Additionally, a horizontal stabilizer may have one or more vertical surfaces to aid in aerodynamic yaw stability. It is often important for a rotorcraft to have the capability of reducing its overall volume for stowage reasons. For example, when transporting multiple rotorcraft in a cargo portion of a cargo plane, it is advantageous to convert the rotorcraft into a stowage configuration. In addition, it is also advantageous to be able to rapidly convert rotorcraft from a stowed configuration to an operable configuration, i.e. rapid deployment.

Referring to FIG. 1, a rotorcraft 101 is depicted with a conventional horizontal stabilizer 103 attached to a tailboom 109. A forward end of tailboom 109 is attached to fuselage 119. A tail rotor 121 is carried by an aft end of tailboom 109.

Referring now to FIG. 2, conventional horizontal stabilizer 103 of rotorcraft 101 is shown in further detail. Horizontal structure 113 extends through an opening in tailboom 109 and is permanently attached to skin 111 of tailboom 109 with fasteners 107. Endplates 115a and 115b are attached to horizontal structure 113 with a plurality of endplate fasteners 117a and 117b. Folding mechanisms 105a and 105b provide a method of stowage for horizontal structure 113. For horizontal stabilizer 103 to be in a stowable configuration, endplates 115a and 115b must be detached by removing fasteners 117a and 117b. Then, because horizontal structure 113 is permanently attached to tailboom 109, folding mechanism 105a and 105b must be used to allow the outboard portions of structure 113 to fold upward to a stowed position.

It is often desirable to create more efficient rotorcraft structure, thereby reducing the number of fasteners, reducing weight, and decreasing the amount of time it takes to stow and deploy an aircraft. There are many rotorcraft horizontal stabilizers known in the art; however, considerable room for improvement remains.

DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
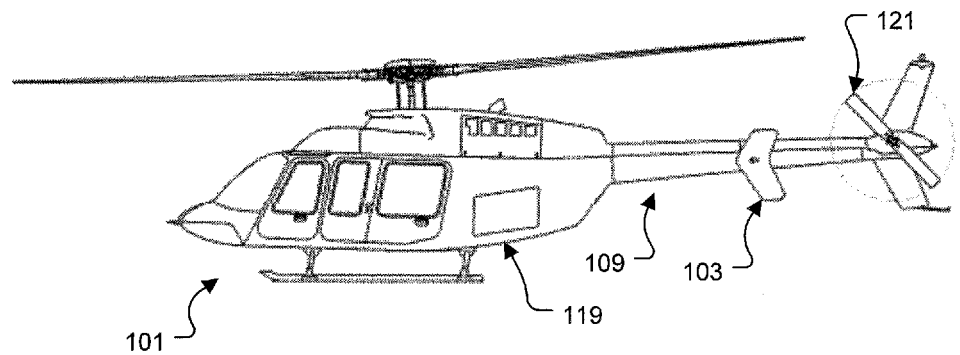
FIG. 1 is a side view of a rotorcraft with a prior art horizontal stabilizer.
Figure 2:
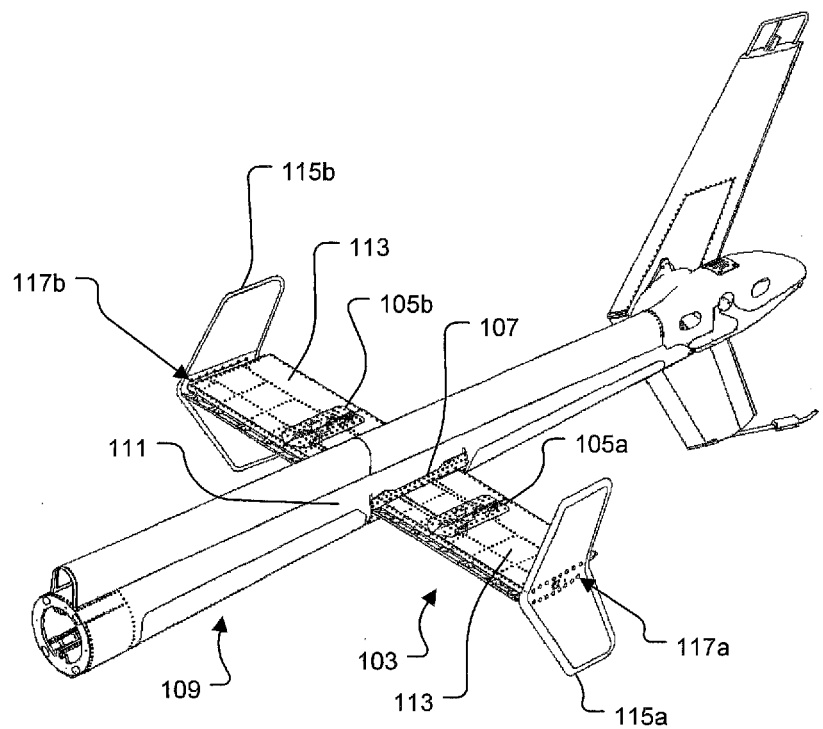
FIG. 2 is a perspective view of the prior art horizontal stabilizer from the rotorcraft of FIG. 1.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application represents a horizontal stabilizer for a rotorcraft and a rotorcraft incorporating the horizontal stabilizer. The horizontal stabilizer of the present application allows for improved rotorcraft functionality. It should also be appreciated that for this application, the term "left" is synonymous with the term "first" and the term "right" is synonymous with the term "second."

Figure 3:
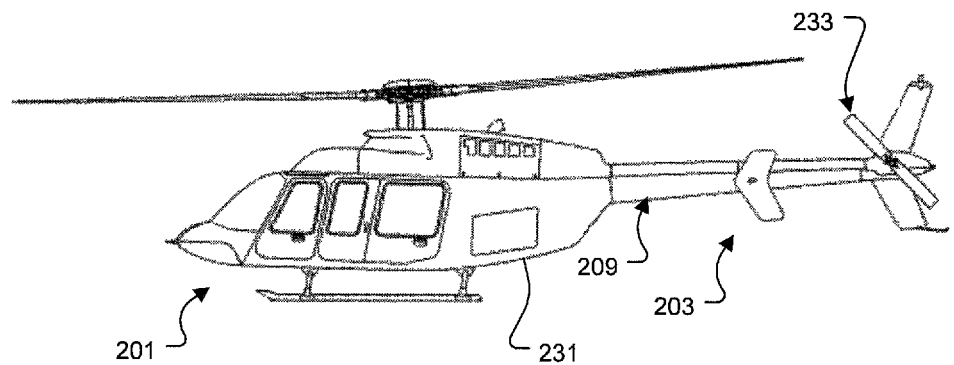
FIG. 3 is a side view of a rotorcraft having a horizontal stabilizer according the preferred embodiment of the present application.

Referring to FIG. 3, a rotorcraft 201 is depicted having a tailboom 209 connected to a fuselage 231. A tail rotor 233 is operably associated with tailboom 209 for providing a means for torque control. A horizontal stabilizer 203 is attached to tailboom 209 in order to provide aerodynamic stability to rotorcraft 201 during flight.

Figure 4:
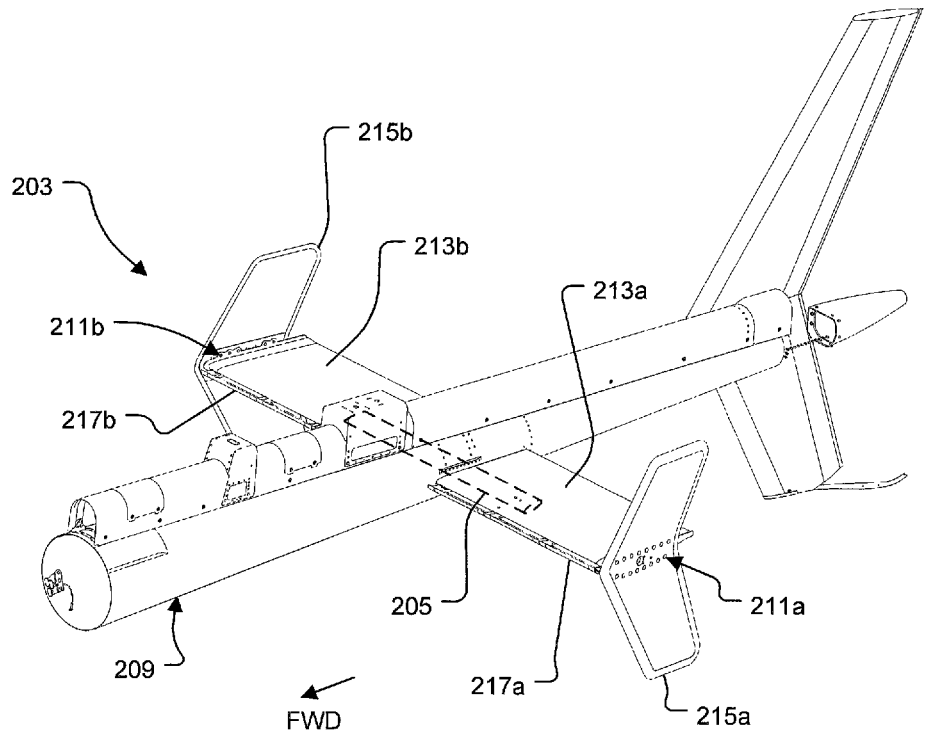
FIG. 4 is a perspective view of the horizontal stabilizer from the aircraft in FIG. 3, according to the preferred embodiment of the present application.

Referring now to FIG. 4, horizontal stabilizer 203 is shown in greater detail. Horizontal stabilizer 203 comprises a left horizontal airfoil 213a, a right horizontal airfoil 213b, and a spar 205. In the preferred embodiment, horizontal stabilizer 203 further comprises a left endplate 215a and a right endplate 215b. Endplates 215a and 215b are coupled to airfoils 213a and 213b with endplate fasteners 211a and 211b, respectively. Left and right endplates 215a and 215b provide aerodynamic yaw stability; however, it should be appreciated that the system of the present application fully contemplates horizontal stabilizer 203 without endplates 215a and 215b. In the preferred embodiment, horizontal stabilizer 203 also comprises leading edge slats 217a and 217b attached to the forward portions of left horizontal airfoil 213a and right horizontal airfoil 213b, respectively. Slats 217a and 217b are meant to optimize desired airflow characteristics of stabilizer 203 at different angle of attacks; however, it should be appreciated that the system of the present application fully contemplates horizontal stabilizer 203 without slats 217a and 217b.

Figure 5:
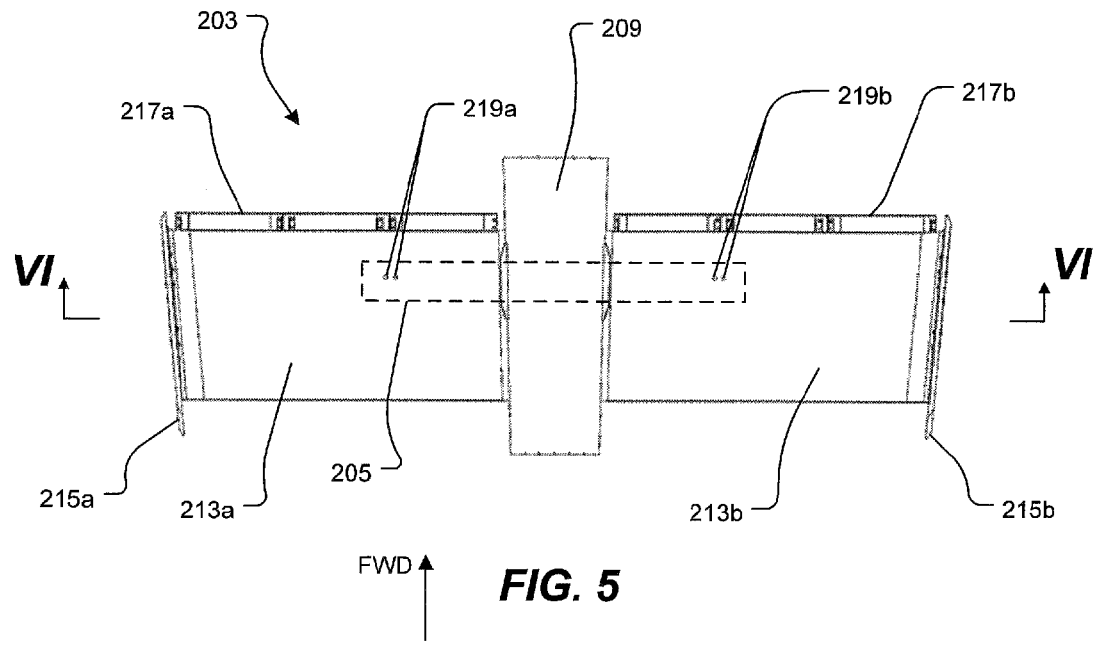
FIG. 5 is a plan view of the horizontal stabilizer of FIG. 4, according to the preferred embodiment of the present application.

Referring now to FIG. 5, which is a plan view of horizontal airfoils 213a and 213b coupled to spar 205, and spar 205 coupled to tailboom 209. Left horizontal airfoil 213a is coupled to spar 205 with at least one removable airfoil attachment fastener 219a. Similarly, right horizontal airfoil 213b is attached to spar 205 with at least one removable airfoil attachment fastener 219b. Fasteners 219a and 219b may be a wide variety of removable fasteners; such as, bolts, screws, and other hardware. It should be appreciated that permanent fasteners, such as rivets, are not preferred. Removal of permanent fasteners typically requires destruction of the permanent fastener, requires a time consuming process, and poses a risk of harmful effects upon surrounding structure. As shown in FIG. 5, the preferred embodiment utilizes two removable airfoil attachment fasteners 219a on the left side, and two removable airfoil attachment fasteners 219b on the right side; however, it is contemplated that other rotorcraft applications may require fewer or greater number of removable fasteners to attach left and right airfoils 213a and 213b to spar 205.

Figure 6:
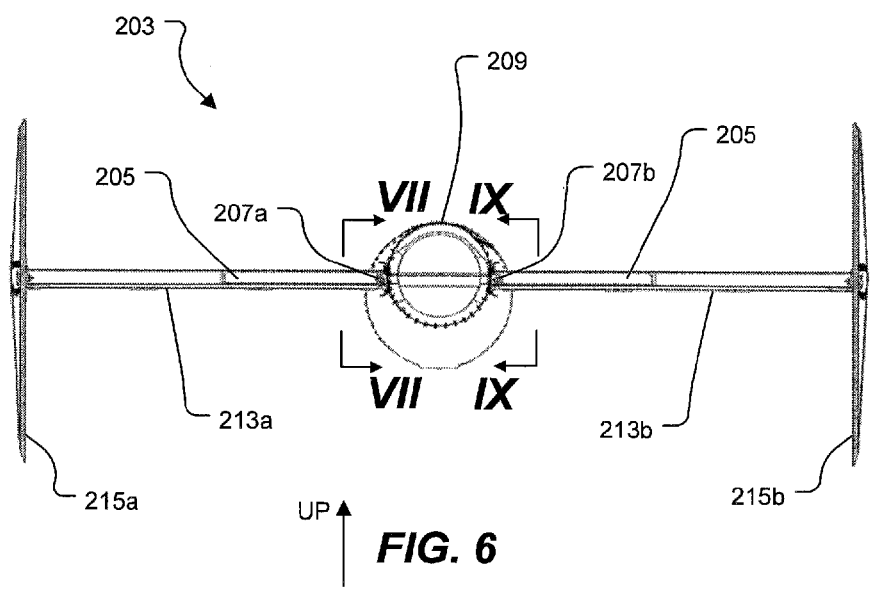
FIG. 6 is a partial cross-sectional view of the horizontal stabilizer, taken along the section lines VI-VI shown in FIG. 5, according to the preferred embodiment of the present application.
Figure 7:
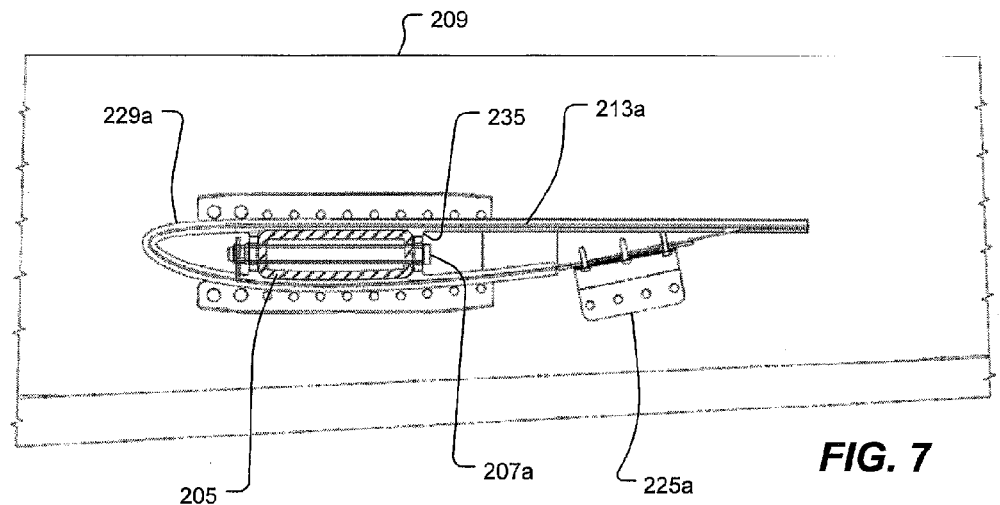
FIG. 7 is a partial cross-sectional view of the horizontal stabilizer, taken along the section lines VII-VII shown in FIG. 6, according to the preferred embodiment of the present application.
Figure 9:
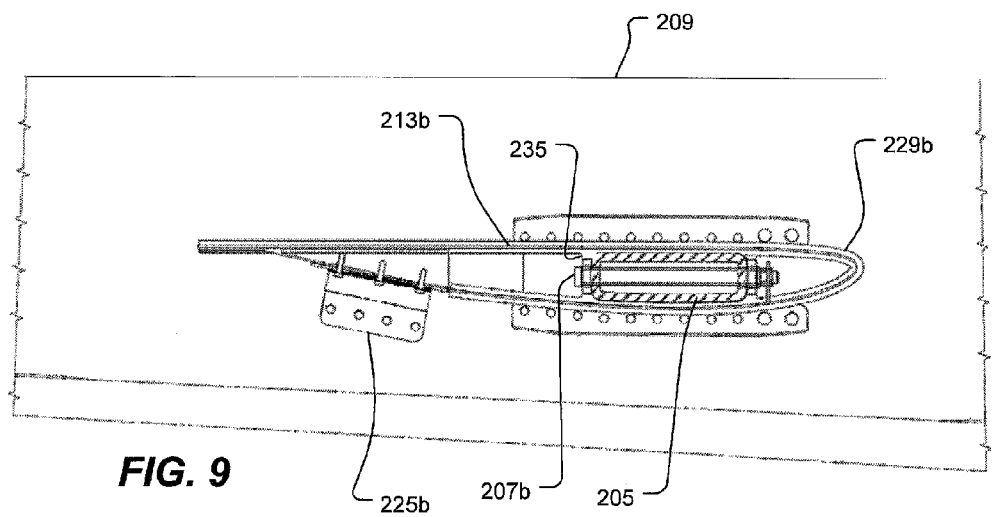
FIG. 9 is a partial cross-sectional view of the horizontal stabilizer, taken along the lines IX-IX shown in FIG. 6, according to the preferred embodiment of the present application.

Referring now to FIG. 6, which is a cross-sectional view, taken along section lines VI-VI in FIG. 5. Spar 205 is coupled to tailboom 209 with spar lug pins 207a and 207b. Spar 205 is located transverse and through tailboom 209. The inboard edges of horizontal airfoils 213a and 213b are located adjacent to an outer skin of tailboom 209. Spar 205 and horizontal airfoils 213a and 213b are preferably made of carbon fiber and bismaleimide (BMI) resin, and formed in a resin transfer molding (RTM) process. The RTM process allows the inner and outer surfaces of spar 205 and horizontal airfoils 213a and 213b to be tooled, thereby providing closely controlled tolerances between spar 205 and horizontal airfoils 213a and 213b. As such, the closely controlled tolerances between spar 205 and horizontal airfoils 213a and 213b provide an efficient structural load path between airfoils 213a and 213b, and tailboom 209. Load (or forces) acting upon airfoils 213a and 213b translate into spar 205 through structural contact between spar 205 and airfoils 213a and 213b; and further through airfoil attachment fasteners 219a and 219b. Further, load (or forces) acting upon spar 205 translate into an attachment structure 235 of tailboom 209 (as best shown in FIGS. 7 and 9), via spar lug pin 207a and 207b. It is important to note that the primary structural load path does not go through a skin of tailboom 209, rather directly into the internal structure of tailboom 209. The fatigue life and corrosion life of tailboom 209 and horizontal stabilizer 203 are increased by utilizing a minimum number of fasteners and by providing the efficient structural load path as described herein. It should be noted that even though it is preferable for spar 205 and horizontal airfoils 213a and 213b to be manufactured of carbon fiber and bismaleimide (BMI) resin through a resin transfer molding (RIM) process; spar 205 and horizontal airfoils 213a and 213b may also be manufactured out of a metal, such as aluminum, through a machining process. In addition, spar 205 and horizontal airfoils 213a and 213b may also be manufactured from other composite materials and processes.

Referring now to FIGS. 7 and 9, which are cross-sectional views looking inboard, taken along section lines VII-VII and IX-IX in FIG. 6, respectively. Though spar 205 is shown having generally rectangular cross section, rounded corners, and a hollow interior, spar 205 may also be of other cross section shapes such as oval, circular, square, or that of an I-beam. Spar lug pins 207a and 207b allow for rapid removal and installation of spar 205 to and from tailboom 209. FIGS. 7 and 9 also depict weatherproof seals 229a and 229b between inboard edges of horizontal airfoils 213a and 213b and outer skin of tailboom 209, respectively. As shown in FIGS. 7 and 9, lug pins 207a and 207b each extend generally in a forward and aft direction, and engage spar 205 with attachment structure 235 of tailboom 209. Attachment structure 235 is configured to provide a primary structural path between spar 205 and tailboom 209. It should be appreciated that bushings, washers, cotter pins, safety wire, nuts and other associated hardware may be used with lug pins 207a and 207b in order to provide an appropriate structural connection between spar 205 and attachment structure 235 of tailboom 209. Left bonding strap 225a and right bonding strap 225b are connected between tailboom 209 and horizontal airfoils 213a and 213b, respectively.

Figure 8:
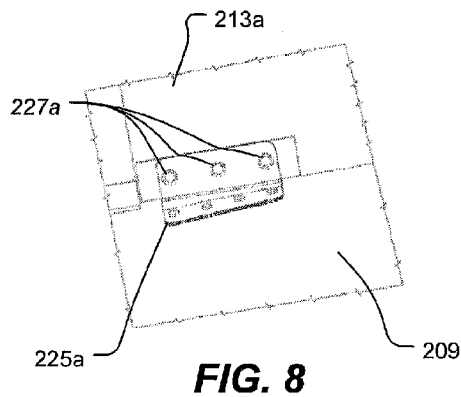
FIG. 8 is a bottom view of the horizontal stabilizer bonding strap shown in FIG. 7, according to the preferred embodiment of the present application.
Figure 10:
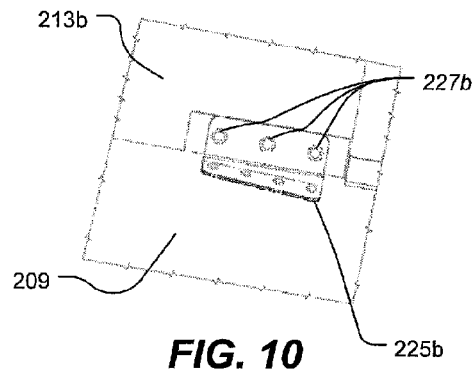
FIG. 10 is a bottom view of the horizontal stabilizer bonding strap shown in FIG. 9, according to the preferred embodiment of the present application.

Referring now to FIGS. 8 and 10, which are bottom views of bonding straps 225a and 225b, respectively. Left bonding strap 225a and right bonding strap 225b provide lightning strike bonding paths between tailboom 209 and horizontal airfoils 213a and 213b, respectively. However, it should be appreciated that bonding straps 225a and 225b may not be required in all installations of horizontal stabilizer 203 on rotorcraft 201; in addition, other forms of lightning strike protection may be used to replace or supplement bonding straps 225a and 225b. Bonding strap 225a is coupled to tailboom 209 and horizontal airfoil 213a. Bonding strap fasteners 227a removably attach bonding strap 225a to airfoil 213a. Similarly, bonding strap 225b is coupled to tailboom 209 and horizontal airfoil 213b. Similarly, bonding strap fasteners 227b removably attach bonding strap 225b to airfoil 213b. As such, bonding strap fasteners 227a and 227b should be unfastened to facilitate removal of horizontal airfoils 213a and 213b from rotorcraft 201. Fasteners 227a and 227b may be a wide variety of removable fasteners; such as, bolts, screws, and other hardware.

Figure 11:
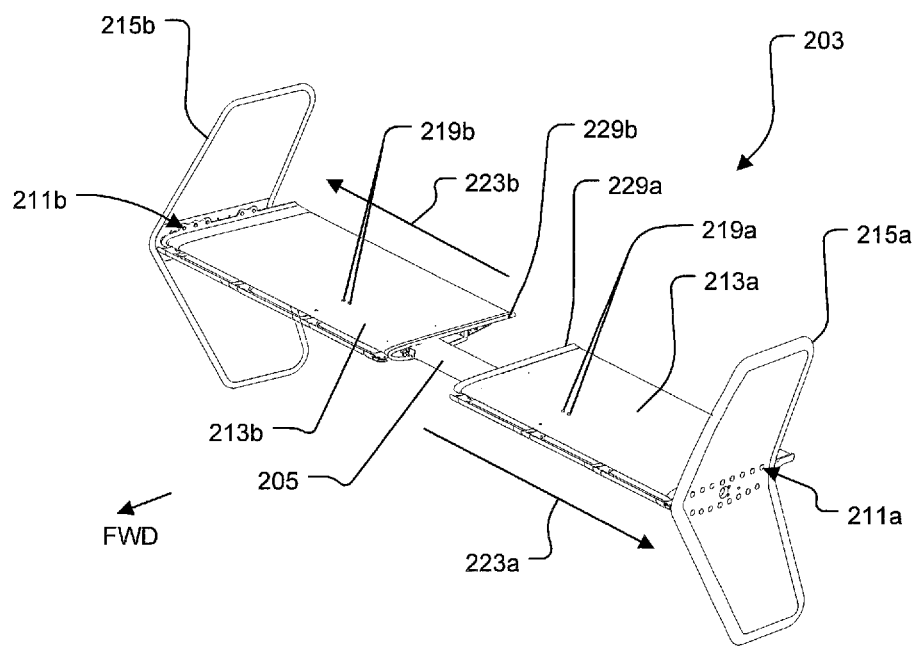
FIG. 11 is a perspective view of the horizontal stabilizer of FIG. 4, according to the preferred embodiment of the present application.
Figure 12:
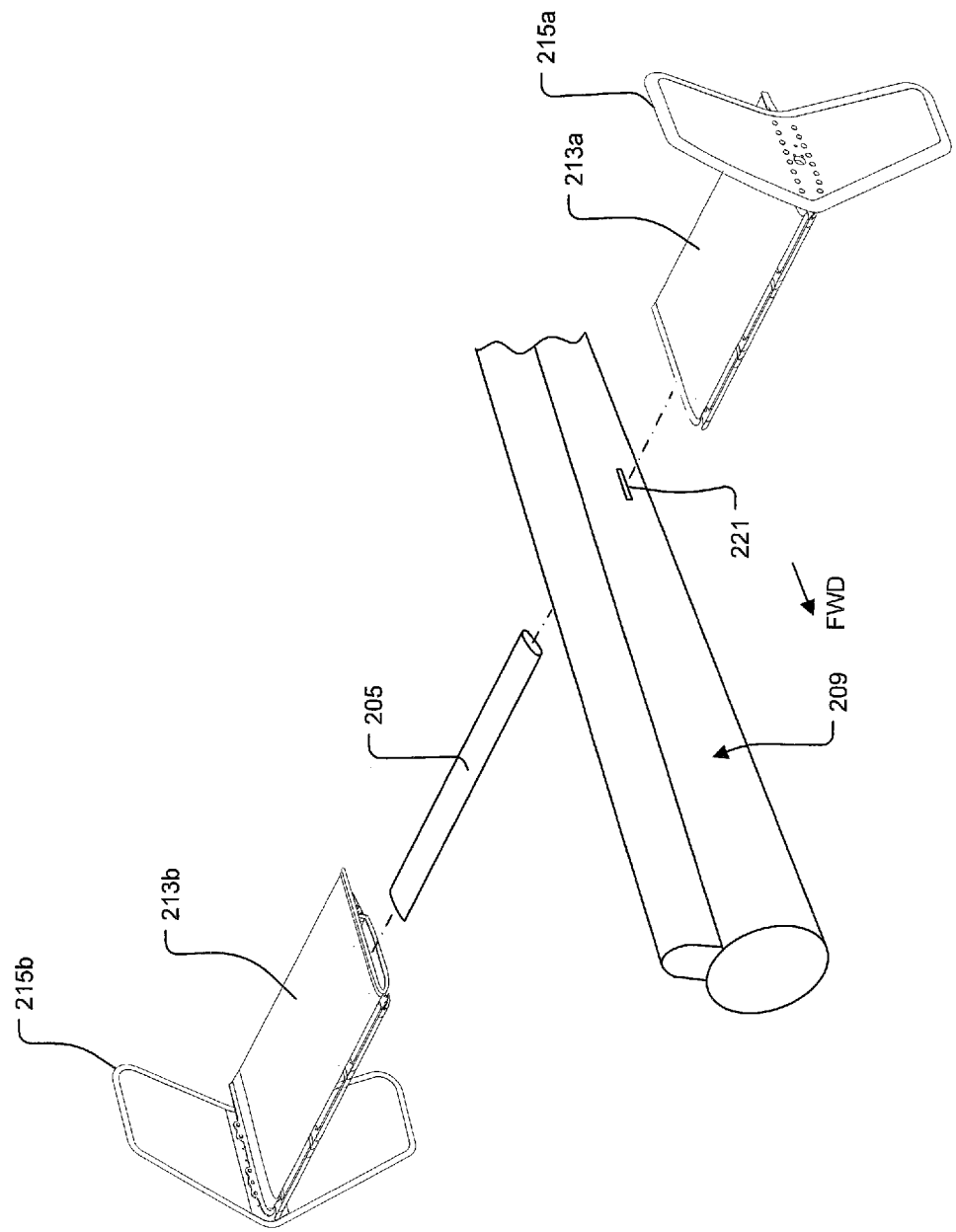
FIG. 12 is an exploded perspective view of the horizontal stabilizer of FIG. 4, removed from the rotorcraft, according to the preferred embodiment of the present application.

Referring now to FIGS. 11 and 12, in which FIG. 11 illustrates horizontal stabilizer 203 assembled, but the remainder of rotorcraft 201 is not shown in order to provide for improved clarity. In FIG. 12, horizontal stabilizer is 203 is illustrated in an exploded view for improved clarity of installation and removal of horizontal stabilizer 203 from tailboom 209. Horizontal stabilizer 203 is configured for rapid removal and installation, to and from rotorcraft 201. In the preferred embodiment, removal of horizontal stabilizer 203 occurs during the process of converting rotorcraft 201 into a stowed configuration. Similarly, installation of horizontal stabilizer 203 occurs when converting rotorcraft 201 into an operable configuration. Removal of left horizontal airfoil 213a, as well as endplate 215a, entails removal of removable airfoil attachment fasteners 219a and bonding strap fasteners 227a. After which, stabilizer 213a can then be slid in an outboard direction 223a away from tailboom 209. Similarly, removal of right horizontal airfoil 213b, as well as endplate 215b, entails removal of removable airfoil attachment fasteners 219b and bonding strap fasteners 227b. After which, stabilizer 213b can then be slid in an outboard direction 223b away from tailboom 209. During this process, it may be necessary to disconnect any electrical harnesses, or other systems related hardware, that may be routed through tailboom 209 and into horizontal stabilizer 203. Removal of spar 205 entails removal of spar lug pins 207a and 207b (shown best in FIGS. 7 and 9), and then sliding spar 205 out of a tailboom opening 221 in either outboard direction 223a or outboard direction 223b. It should be noted that it is not required to remove endplates 211a and 211b from horizontal airfoils 213a and 213b, respectively, in order to remove horizontal stabilizer 203 from rotorcraft 201. Installation of horizontal stabilizer 203 is the reverse process of removal of horizontal stabilizer 203, as previously described. For purposes of this application, removal of horizontal stabilizer 203 is equivalent to stowing of horizontal stabilizer 203, and installation of horizontal stabilizer 203 is equivalent to deployment of horizontal stabilizer 203. It should also be noted that tailboom opening 221 can be only large enough for spar 205 to enter tailboom 209. Opening 221 should be too small for horizontal airfoils 213a and 213b to enter tailboom 209; as such, this improved structural efficiency allows for enhanced performance of rotorcraft 201.

The system of the present application provides significant advantages, including: (1) providing a easily stowable horizontal stabilizer without a heavy folding mechanism; (2) reducing horizontal stabilizer fastener part count so as to decrease labor and maintenance costs, increasing fatigue life, decreasing weight, and reducing likelihood of corrosion; (3) decreasing the amount of time and labor required between horizontal stabilizer stowage and deployment; (4) reducing the size of the opening required within the tailboom so as to improve structural characteristics; and (5) improving rotorcraft performance.

It is apparent that a system with significant advantages has been described and illustrated. Although the system of the present application is shown in a limited number of forms, it is not limited to just these forms, but is amenable to various changes and modifications without departing from the spirit thereof.

What is claimed is:

1. A removable horizontal stabilizer configured to provide aerodynamic stability for a rotorcraft having a tailboom, the horizontal stabilizer comprising:
    a spar configured to be transversely located at least partially inside an opening in the tailboom;
    a removable spar attachment member for structurally attaching the spar directly to internal structure of the tailboom;
    a horizontal airfoil adapted to fittingly receive the spar;
    a removable airfoil attachment member for structurally attaching the first horizontal airfoil to the spar; and
    wherein a primary structural load path translates loads from the horizontal airfoil directly to internal structure of the tailboom through structural contact between the spar and the horizontal airfoil, the horizontal airfoil avoiding contact with skin around the tailboom.

2. The horizontal stabilizer according to claim 1, wherein the spar has generally a rectangular cross sectional shape.

3. The horizontal stabilizer according to claim 1, further comprising:
    a first vertical endplate coupled to the first horizontal airfoil; and
    a second vertical endplate;
    wherein the first and second vertical endplates provide aerodynamic yaw stability for the rotorcraft.

4. The horizontal stabilizer according to claim 1, further comprising:
    a bonding strap removably fastened to the horizontal airfoil for providing a ground path between the horizontal airfoil and the tailboom.

5. The horizontal stabilizer according to claim 1, wherein the removable spar attachment member comprises a lug pin.

6. The horizontal stabilizer according to claim 1, further comprising:
    a seal positioned between an inboard edge of the horizontal airfoil and the tailboom.

7. The horizontal stabilizer according to claim 1, wherein the horizontal airfoil is configured for removal from the rotorcraft by removing the removable airfoil attachment member and sliding the horizontal airfoil outboard.

8. The horizontal stabilizer according to claim 1, wherein the spar is configured for removal from the rotorcraft by removing the removable spar attachment member, and sliding the spar laterally away from the tailboom.

9. The horizontal stabilizer according to claim 1, further comprising:
    a stationary leading edge slat attached to the left and right horizontal airfoils so as to optimize airflow characteristics of the left and right horizontal airfoils at different angle of attacks.

10. The horizontal stabilizer according to claim 1, wherein at least one of the spar and the horizontal airfoil, is formed from a resin transfer molding process.

11. The horizontal stabilizer according to claim 1, further comprising a leading edge slat for tailoring airflow across the horizontal airfoil.

12. The horizontal stabilizer according to claim 1, wherein at least one of the spar and the horizontal airfoil comprises carbon fiber and bismaleimide (BMI) resin.

* * * * *